(12) United States Patent  
Ford et al.

(10) Patent No.: US 8,797,707 B2  
(45) Date of Patent: Aug. 5, 2014

(54) SYSTEMS AND METHODS OF POWER CONVERSION FOR ELECTROSTATIC PRECIPITATORS

(71) Applicant: Redkoh Industries, Inc., Hillsborough, NJ (US)

(72) Inventors: Paul Ford, Hillsborough, NJ (US); John Jannone, Hillsborough, NJ (US); Neil Flynn, Hillsborough, NJ (US); Hank Del Gatto, Hillsborough, NJ (US)

(73) Assignee: Redkoh Industries, Inc., Hillsborough, NJ (US)

( * ) Notice: Subject to any disclaimer, the term of this patent is extended or adjusted under 35 U.S.C. 154(b) by 63 days.

(21) Appl. No.: 13/714,673

(22) Filed: Dec. 14, 2012

(65) Prior Publication Data

US 2014/0168848 A1 Jun. 19, 2014

(51) Int. Cl.  
*H02H 3/18* (2006.01)

(52) U.S. Cl.  
USPC .............................................. 361/235; 361/79

(58) Field of Classification Search  
USPC .................................................. 361/79, 235  
See application file for complete search history.

(56) References Cited

U.S. PATENT DOCUMENTS 5,068,811 A * 11/1991 Johnston et al. ............... 700/297  
5,255,178 A * 10/1993 Liberati ............................ 96/80  
8,233,255 B1  7/2012 Ford et al.

* cited by examiner

*Primary Examiner* — Danny Nguyen  
(74) *Attorney, Agent, or Firm* — Ryan A. Schneider, Esq.; Mark Lehi Jones; Troutman Sanders LLP

(57) ABSTRACT

The disclosed technology describes methods and apparatus to convert and control power provided to a precipitator. An example embodiment of the disclosed technology includes a method for providing power to a device. The method includes receiving a first silicon controlled rectifier (SCR) signal and a second SCR signal from a controller device, generating a demand signal by the controller device based on a comparison of the first and second SCR signals, transmitting the demand signal to a power converter device, converting a first power signal from a first base frequency to a second power signal at a second base frequency, wherein the first base frequency is in the range of approximately 50 Hz to approximately 60 Hz and wherein the second base frequency is controlled in the range of approximately 100 Hz to approximately 1000 Hz, and switching the second power signal to the controller device.

20 Claims, 11 Drawing Sheets

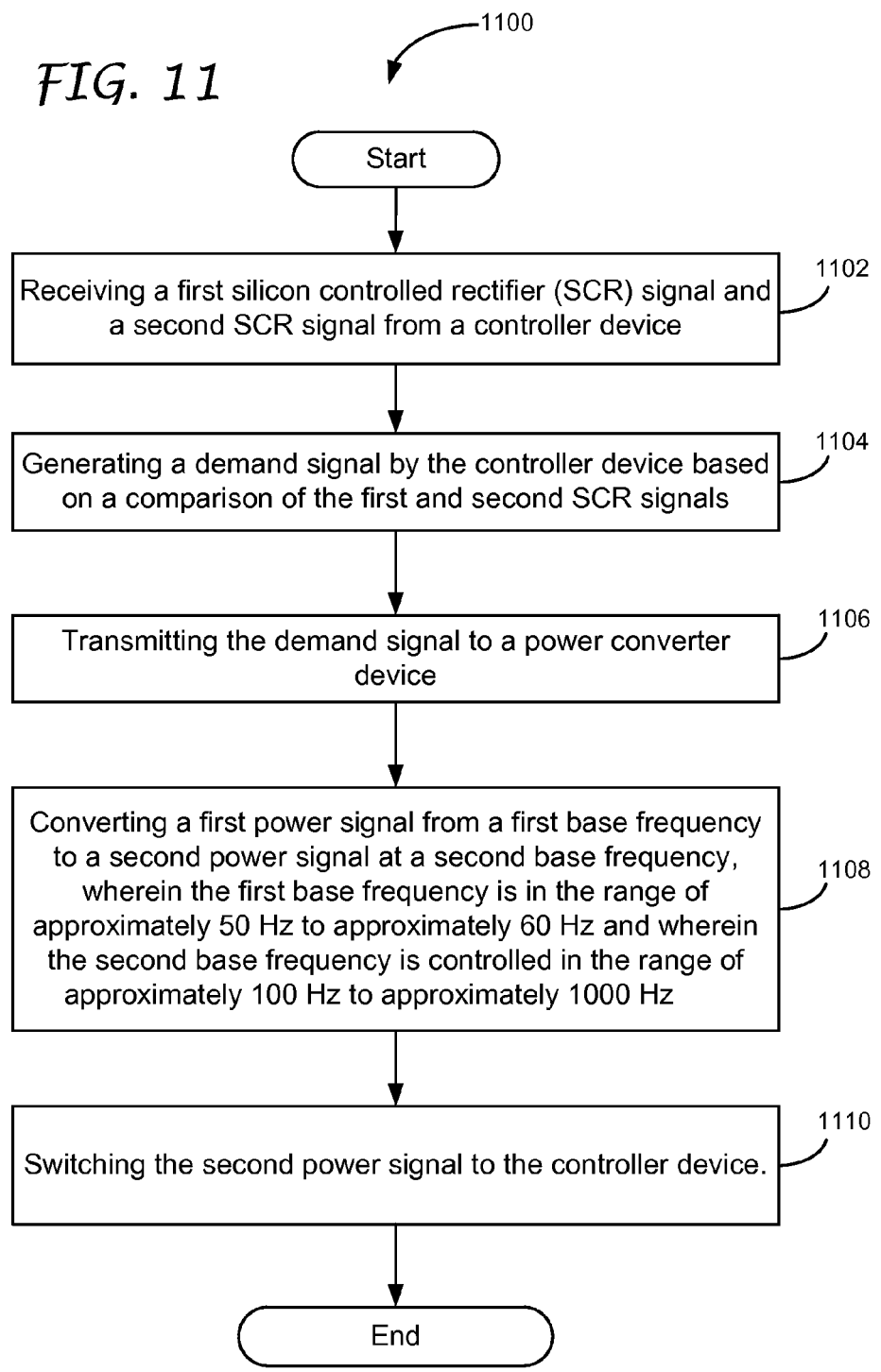

SYSTEMS AND METHODS OF POWER CONVERSION FOR ELECTROSTATIC PRECIPITATORS

FIELD OF THE DISCLOSED TECHNOLOGY

This disclosed technology relates generally to the field of power supplies, and specifically to systems and methods to convert the power supplied to electrostatic precipitators.

BACKGROUND

Electrostatic precipitators are used in a variety of different applications, including filtering particulate from the emissions of a power plant coal combustion process. An electrostatic precipitator is a particulate collection device capable of removing particles from flowing gas using the force of an induced electrostatic charge. An electrostatic precipitator typically has a negative voltage energy field and a positive voltage energy field. In practice, the flowing gas passes first through the negative voltage energy field, and the solid particulate is negatively charged. The negatively charged solid particulate matter is attracted to, and collected on, a positive collecting plate.

To be effective, an electrostatic precipitator must be enabled to hold a precise and consistent amount of electrical charge. Thus, electrostatic precipitators require precise and efficient power supplies to apply the proper potential to the precipitator. Conventional power supplies for electrostatic precipitators are often inefficient. Furthermore, many prior art systems that may enable the supply of power at a relatively high frequency range are costly to implement and are incompatible with existing electrostatic precipitator systems. Therefore, it is highly desired to provide a device that is compatible with existing hardware and enabled to provide a more efficient and controlled power source for an electrostatic precipitator.

BRIEF SUMMARY

Embodiments of the disclosed technology included methods and apparatus to convert and control power provided to a device. In an example embodiment, the device is an electrostatic precipitator.

An example embodiment of the disclosed technology includes a method for providing power to a device. The method includes receiving a first silicon controlled rectifier (SCR) signal and a second SCR signal from a controller device, generating a demand signal by the controller device based on a comparison of the first and second SCR signals, transmitting the demand signal to a power converter device, converting a first power signal from a first base frequency to a second power signal at a second base frequency, wherein the first base frequency is in the range of approximately 50 Hz to approximately 60 Hz and wherein the second base frequency is controlled in the range of approximately 100 Hz to approximately 1000 Hz, and switching the second power signal to the controller device.

An example embodiment of the disclosed technology also includes a system. The system includes a precipitator power frequency converter system. The precipitator power frequency converter system includes an insulated-gate bipolar transistor ("IGBT") system, a converter control system that includes a microprocessor in communication with the IGBT system, and a rectifier set in communication with the IGBT system. The microprocessor is configured to receive a first silicon controlled rectifier ("SCR") signal and a second SCR signal from a transformer rectifier control device. The microprocessor is further configured for generating a switching signal to actuate the IGBT system based at least in part on a comparison of the first SCR signal and the second SCR signal. Input power is received by the precipitator power frequency converter system in a first base frequency range of approximately 50 Hz to 60 Hz and the precipitator power frequency converter system is enabled to selectively provide an output power in a second base frequency controlled in a range between 100 Hz and 1000 Hz.

In an example embodiment, a precipitator power frequency converter system is provided and includes an IGBT system and a converter control system including a microprocessor in communication with the IGBT system. In addition, the power frequency converter system provides a rectifier set in communication with the IGBT system. Furthermore, the input power received by the precipitator power frequency converter system is in a first frequency range of approximately 50 Hz to 60 Hz and the precipitator power frequency converter system may be enabled to provide an output power in a second frequency range between 100 Hz and 1000 Hz. Certain example embodiments of the disclosed technology may utilize various pulse width modulation (PWM) schemes. Certain example implementations may include utilizing a quasi-amplitude modulation PWM.

In an example embodiment of the disclosed technology, a method for precipitator power frequency conversion is provided that may include receiving a first silicon controlled rectifier (SCR) signal and a second SCR signal from a transformer rectifier control device. Additionally, the method for precipitator power frequency conversion may include comparing the first and second SCR signal at the point in which the input voltage of a power source passes through zero. Furthermore, the method may include generating a demand signal based on the comparison, and enabling the demand signal to actuate an insulated-gate bipolar transistor (IGBT) system. Certain example embodiments of the disclosed technology may include systems and methods for converting the frequency of the output power to a frequency (i.e., the second frequency) in range between 100 Hz to 1000 Hz. Example embodiments may adjust the frequency to maximize the power transfer of the transformer rectifier (TR) system in conjunction with the effective series impedance of the TR primary circuit. Furthermore, example embodiments of the disclosed technology may include systems and methods for controlling the precipitator power level through the use of pulse width modulation and/or the use of amplitude modulation of the TR primary signal.

These and other objects, features and advantages of the disclosed technology will become more apparent upon reading the following specification in conjunction with the accompanying drawing figures.

BRIEF DESCRIPTION OF THE FIGURES

FIG. 11 is a flow diagram of a method according to an example embodiment of the disclosed technology.

DETAILED DESCRIPTION

Figure 1:
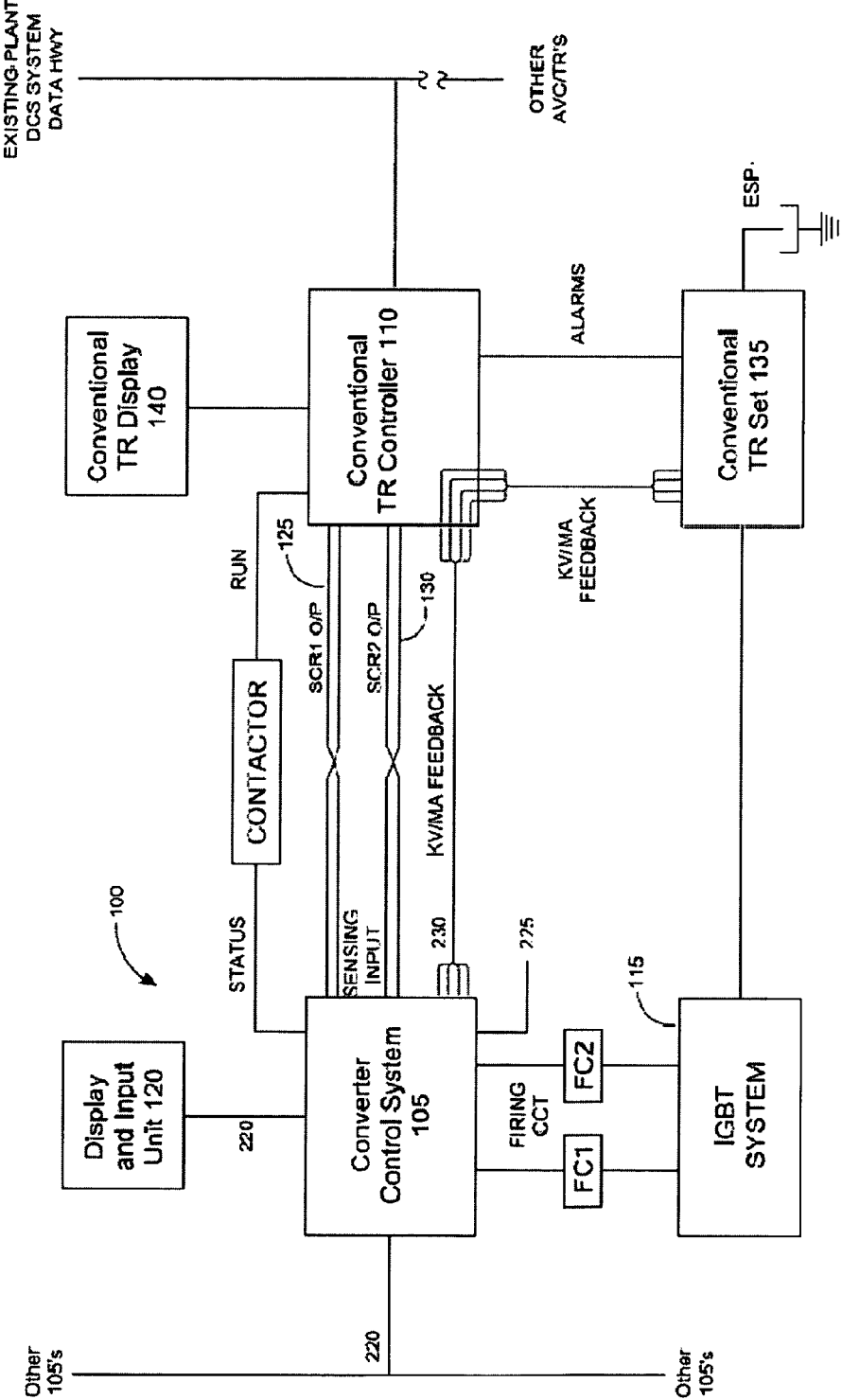
FIG. 1 is a block diagram of the precipitator power frequency converter system 100 in accordance with an example embodiment of the disclosed technology.

In the following description, numerous specific details are set forth. However, it is to be understood that implementations of the disclosed technology may be practiced without these specific details. In other instances, well-known methods, structures and techniques have not been shown in detail in order not to obscure an understanding of this description. References to "one implementation," "an implementation," "example implementation," "various implementations," "example embodiment," etc., indicate that the implementation(s) of the disclosed technology so described may include a particular feature, structure, or characteristic, but not every implementation necessarily includes the particular feature, structure, or characteristic. Further, repeated use of the phrase "in one implementation" does not necessarily refer to the same implementation, although it may.

To facilitate an understanding of the principles and features of the disclosed technology, example embodiments are explained hereinafter with reference the figures and flow diagrams. In particular, the disclosed technology is described in the context of a power converter and controller capable of efficiently and effectively providing power to a precipitator.

The device components described hereinafter are intended to be illustrative and not restrictive. Many suitable components that would perform the same or a similar function as the components described herein are intended to be embraced within the scope of the disclosed technology. Such other components not described herein may include, but are not limited to, for example, components that are developed after the time of the development of the disclosed technology.

Embodiments of the disclosed technology address certain deficiencies of traditional systems with respect to the ability to provide a power signal to an electrostatic precipitator in a mid-frequency and low frequency range. In an example embodiment, the disclosed technology provides a precipitator power frequency converter system for an electrostatic precipitator power supply. More particularly, a precipitator power frequency converter system is provided specifically for use on electrostatic precipitators. The precipitator power frequency converter system may be incorporated into a variety of existing electrostatic precipitator control systems.

Example embodiments of the precipitator power frequency converter system may provide certain benefits over traditional power supplies. The precipitator power frequency converter system, provided in accordance with an example embodiment of the disclosed technology, may provide improved reliability, lower Electromagnetic Interference (EMI), improved control techniques and faster responses than traditional systems.

In an example embodiment, the precipitator power frequency converter system includes control software. The control software not only provides the system with a fundamental 100 Hz to 1000 Hz frequency switched power supply to the electrostatic precipitator, but also ensures that the potential applied to the electrostatic precipitator is in such a manner as to maintain the highest level of performance and the minimum level of disruption. In an example embodiment, the precipitator power frequency converter system may utilize both hardware and software driven protection elements to manage both control and precipitator faults.

In an example embodiment, the design platform and data communications software of the precipitator power frequency converter system may be compatible with other power supply controllers, including traditional controllers. In an example embodiment, the precipitator power frequency converter system may permit the user to maintain use of conventional 60/50 Hz Transformer Rectifier (TR) sets, and also, the more compact 100 Hz to 1000 Hz Transformer Rectifiers.

In certain example implementations of the disclosed technology, the precipitator power frequency converter system may be implemented in a variety of existing and conventional electrostatic precipitator configurations. For example, an embodiment of the precipitator power frequency converter system may be used by those customers who have smaller precipitators and whose budgets and needs do not require changing complete systems. The precipitator power frequency converter system may assist with the determination as to the likely effects a precipitator may experience as it switches between conventional and higher frequency excitation.

According to an example implementation of the disclosed technology, the precipitator power frequency converter system may utilize a set of Insulated-Gate Bipolar Transistor (IGBT's) to develop voltage that enhances the performance of the electrostatic precipitator. In an example embodiment, the precipitator power frequency converter system design pays specific attention to the fact that earlier controls have relied on voltage Zero Crossings to determine when voltage may be applied to the transformer rectifier set. In this example embodiment, following this attribute allows the precipitator power frequency converter system to be utilized within the context of existing Silicon Controlled Rectifier (SCR)-based and existing transformer rectifier controls.

In an example embodiment, the precipitator power frequency converter system may be configured to receive SCR signals from a conventional TR control device to determine the level of power to be applied to the precipitator load. In an example embodiment, the precipitator power frequency converter system may include an on-board microprocessor to convert the SCR signals output from a conventional TR control device into a firing signal suitable for use with an IGBT based mid frequency and low frequency power supply, so that the power applied to the precipitator may be converted from the standard 100/120 Hz to the mid and low frequency range of approximately 100 Hz to 1000 Hz.

According to an example implementation of the disclosed technology, the base frequency may be selected within the approximate range of 100 Hz to approximately 1000 Hz depending on the specific application, and the base frequency may be set as a function of several parameters. For example, parameters that affect the efficiency vs. frequency relationship include the TR system inductance, the electrostatic precipitator (ESP) field effective resistance and/or capacitance, and the spark-over voltage of the ESP field. In one example embodiment, the base frequency may be set automatically by the program control of the converter system. In another example implementation, the base frequency may be set manually by a system operator.

According to an example embodiment, a three phase supply may be used to power the precipitator power frequency converter system. The three phases may be applied, for example, via a suitably rated molded case circuit breaker (MCCB) to a full wave three phase rectifier to convert the power from an AC signal to a DC signal. This DC power may be applied to a capacitor bank, in an example embodiment, to further smooth the power signal and store charge for use by a set of switching IGBTs. According to an example implementation of the disclosed technology, upon enabling the precipitator power frequency converter system, a microprocessor may send a signal to close a contactor and set the system in operation. In an example embodiment, the microprocessor of the precipitator power frequency converter system may generate a firing signal that may be utilized to determine the frequency and the output power and/or voltage that the IGBT system will provide. This output, for example, may be delivered in via output terminals to a current limiting reactor and then to the primary of a transformer rectifier. In this example embodiment, the transformer rectifier may convert the switched AC voltage to a high DC voltage for further application to the electrostatic precipitator.

In an example embodiment, the precipitator power frequency converter system may include a converter control system to monitor feedback signals from potential transformers, current transformers and from the IGBT driver circuits to ensure safe and efficient operation of both the precipitator power frequency converter system and the precipitator. In an example embodiment, the converter control system may further monitor the voltage applied to, and the current drawn by the precipitator in order to control the high voltage output to within the most acceptable and efficient operating conditions.

In example embodiment of the disclosed technology, a precipitator power frequency converter system is provided, which includes an insulated-gate bipolar transistor (IGBT) system and a converter control system comprising a microprocessor in communication with the IGBT system. In an example implementation, the power frequency converter system may include a rectifier set in communication with the IGBT system. Furthermore, the input power received by the precipitator power frequency converter system may have a first frequency range of approximately 50 Hz to 60 Hz and the precipitator power frequency converter system may provide an output power in a second frequency range between 100 Hz and 1000 Hz.

In an example embodiment of the disclosed technology, a method for precipitator power frequency conversion is provided that includes receiving a first silicon controlled rectifier (SCR) signal and a second SCR signal from a transformer rectifier control device. Additionally, the method for precipitator power frequency conversion may include comparing the first and second SCR signal when the input voltage of a power source passes through zero. Furthermore, the method may include generating a demand signal based on the comparison, and enabling the demand signal to actuate an insulated-gate bipolar transistor (IGBT) system.

Referring now to the figures, wherein like reference numerals represent like parts throughout the figures, example embodiments of the disclosed technology will be described in detail.

FIG. 1 is a block diagram of the precipitator power frequency converter system 100 in accordance with an example embodiment of the disclosed technology. In an example embodiment, the precipitator power frequency converter system 100 may include a converter control system 105. In an example implementation, the converter control system 105 may include control logic enabled to monitor a conventional TR controller 110 and control an IGBT system 115. The IGBT system 115, in an example embodiment of the precipitator power frequency converter system 100, may be a switched mode power supply unit. In an example implementation, the IGBT system 115 may enable the output of the precipitator power frequency converter system 100 to be controlled in terms of conduction angle and frequency.

In the example embodiment shown in FIG. 1, the converter control system 105 may be configured to receive input from the conventional TR controller 110. In an example embodiment, the converter control system 105 may receive the Silicon Controlled Rectifier (SCR) outputs 125 130 from the conventional TR controller 110. The SCR outputs 125 130 may act as a control signal for an example embodiment of the converter control system 105.

In an example embodiment, the converter control system 105 may be provided in connection to a display and input unit 120. In an example embodiment of the precipitator power frequency converter system 100, the display and input unit 120 may provide a user with an interface to the converter control system 105 to permit configuration and modification of the settings and operation of the precipitator power frequency converter system 100. Those of skill in the art will appreciate that the display and input unit 120 may be a device that is permanently attached to the precipitator power frequency converter system 100 in some example embodiments. In other example embodiments, the display and input unit 120 may be removable from the system. For example, in one embodiment, the display and input unit 120 may be a portable computer that may communicate with the converter control system 105 over a wireless link when in sufficient proximity to the system 105. In an example implementation, the display and input unit 120 may be a portable computer that may communicate with the converter control system 105 via a wired link.

Figure 2:
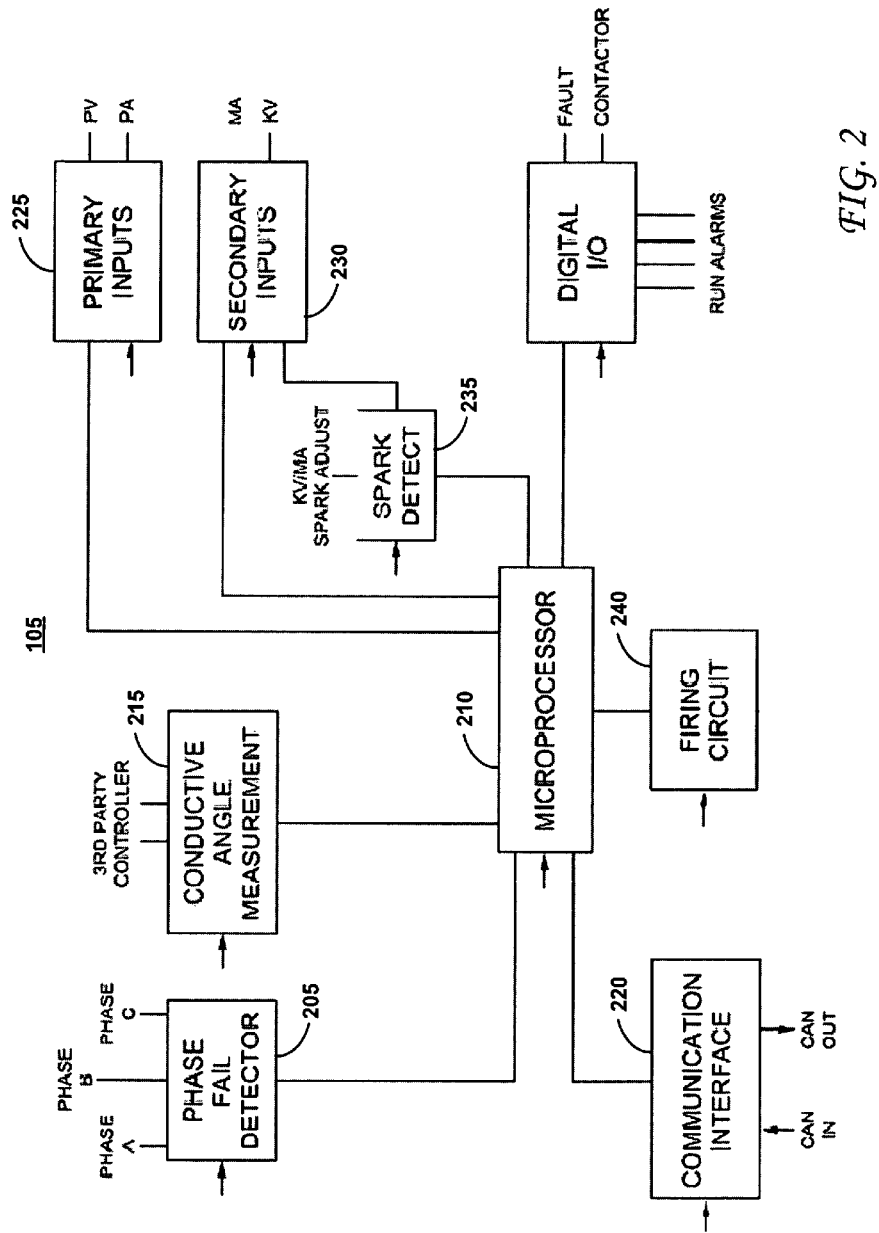
FIG. 2 is a block diagram of the converter control system 105 in accordance with an example embodiment of the disclosed technology.

FIG. 2 is a block diagram of the converter control system 105 in accordance with an example embodiment of the disclosed technology. In an example embodiment, the converter control system 105 includes a phase fail detector 205 that may be configured to detect the presence of all three phases of an input power supply. The phase fail detector 205 may be enabled to ensure that the main power capacitors of the precipitator power frequency converter system 100 receive sufficient field power and are not be subjected to damaging amounts of ripple. In an example embodiment, the phase fail detector 205 may be provided in connection to a power input arranged as an arithmetic summing amplifier, in which the voltage that arrives at the converter control system 105 is the sum of each of the three phases of the power supply. In this embodiment, the failure of any one of three phases may reduce the voltage sensed by the phase fail detector 205 of the converter control system 105 and appropriate action, such as an alert and/or automatic shutdown may be taken in response to the detected failure. For example, in the event that an example embodiment of the phase fail detector 205 detects that one or more of the three phases of input power is deficient, the phase fail detector 205 may send a signal to the microprocessor 210 of the converter control system 105. The signal sent by an example embodiment of the phase fail detector 205 may provide an indication as to the level and/or type of failure of the input power. In an example embodiment, the microprocessor 210 may be configured to analyze the signal from the phase fail detector 205 and determine the proper adjustment to the operation of the converter control system 105. For example, the microprocessor 210 may determine whether it is safe to fire the IGBT system 115 at a level above a predetermined safe level of power operation.

In one example embodiment, the microprocessor 210 may instruct the precipitator power frequency converter system 100 to operate in a state of alarm and reduced output. In an alternative embodiment, the microprocessor 210 may receive the signal from the phase fail detector 205 and cause the precipitator power frequency converter system 100 to shutdown and remain locked until the failure detected by the phase fail detector 205 is restored.

FIG. 2 depicts an example embodiment of the converter control system 105, which may include a conductive angle measurement device 215 configured to receive the SCR outputs 125 130 from a conventional TR controller 110 (as shown in FIG. 1). The SCR outputs 125 130 may provide the conductive angle measurement device 215 with appropriate control signals. In an example implementation, these control signals 25 130 received by the conductive angle measurement device 215 may be optically coupled. In an example embodiment, the conductive angle measurement device 215 may be configured to evaluate the SCR output signals 125 130 in comparison to the zero crossing point, i.e. the point in time at which the input voltage passes through zero. In an example implementation, the SCR outputs 125 130 from a conventional TR controller 110 may be analyzed by microprocessor 210. When the input power, such as the line voltage, passes through the zero level, an interrupt may be generated for the microprocessor 210 in an example embodiment, and a similar interrupt may be generated from reading the SCR outputs 125 130. In an example embodiment, the converter control system 105, having read the two interrupts, may then determine the demand of the Conventional TR Controller 110. This demand may be manipulated for the change in frequencies by an example embodiment of the converter control system 105 and may be used as a Demand to control the conduction angle communicated to the IGBT system 115. In an example implementation, the Demand signal may represent the requirement for the transformer rectifier.

An example embodiment of the converter control system 105, as shown in FIG. 2, may include a communication interface 220 that may enable the converter control system 105 to communicate with other devices, including input/output devices and other control devices. In an example embodiment, the converter control system 105 may also provide primary inputs 225, which may be the transformer/rectifier primary signals derived from the primary voltage and/or current feedback from the conventional TR controller 110. These primary inputs 225 may be used in an example embodiment to verify the outputs of the converter control system 105. Furthermore, the primary inputs 225 may enable the converter control system 105 to ensure compliance with the rating of the hardware external to the precipitator power frequency converter system 100.

In an example implementation, the converter control system 105, as shown in FIG. 2, may also provide secondary inputs 230 including the secondary voltage and secondary current feedback signals derived from the high voltage conventional TR set 135. The secondary inputs 230 may be relied on by an example embodiment of the converter control system 105 to verify that that the outputs of the precipitator power frequency converter system 100 are correctly applied to the electrostatic precipitator being powered. More specifically, the microprocessor 210 of an example embodiment of the converter control system 105 may monitor the second inputs 230 to ensure compliance with the ratings of the hardware external to the precipitator power frequency converter system 100.

Additionally, as shown in FIG. 2, and in an example embodiment, the secondary inputs 230 may be configured in communication with both the microprocessor 210 and a spark detection device 235. The spark detection device 235, according to an example embodiment, may enable spark and arc detection by the precipitator power frequency converter system 100. Sparking is a phenomenon that limits the electrical excitation of the electrostatic precipitator, and represents an upper limit of the precipitator voltage that may be applied to the gas that is being treated in an exhaust stack. Sparking may occur, for example, due to a localized ionization of gas when the voltage potential exceeds a certain value. The ionization voltage may depend on many factors, including but not limited to humidity, exhaust species, temperature, precipitator configuration, etc. Such sparking that may provide an electrical path between plates of the precipitator, and may result in a rapid rise in electrical current with an associated decrease in voltage. Therefore, instead of having the corona current distributed evenly across the entire field for the electrostatic precipitator, there is a high amplitude spark that may funnel the available current in one path rather than an innumerable number of paths. This may cause damage to the internal components of the electrostatic precipitator and may disrupt the entire operation of the electrostatic precipitator. An example embodiment of the spark detection device 235 enables the converter control system 105 to detect and prevent the damage that may result from sparking within an electrostatic precipitator.

As shown in the example embodiment in FIG. 2, the spark detection device 235 may be configured to receive the secondary inputs 230 made up of the secondary voltage and secondary current feedback signals derived from the high voltage conventional TR set 135. According to an example implementation of the disclosed technology, the spark detection device 235 may determine when preprogrammed level of disruption in the power provided to an electrostatic precipitator has occurred. The spark detection device 235 may provide a signal to the microprocessor 210 to indicate that sparking or arcing has occurred in the electrostatic precipitator. In an example implementation, the microprocessor 210 may be configured to take a variety of different actions based upon the signal provided by the spark detection device 235. For example, the microprocessor 210 may provide a signal to quench or setback the power supplied by the precipitator power frequency converter system 100 to dissipate the spark or arc. In some embodiments, the microprocessor 210 may be configured to provide the quench or setback instruction without regard to the Demand signal from the conventional TR controller 110. In an example implementation, once the spark detection device 235 determines that the spark or arc has dissipated, the microprocessor 210 may instruct the precipitator power frequency converter system 100 to resume normal operation.

An example embodiment of the converter control system 105 may include a firing circuit 240. In an example implementation, the firing circuit 240 may be configured to receive the Demand signal generated by the microprocessor 210 of the converter control system 105. In an example embodiment, the firing circuit 240 may be enabled to convert the Demand signal into a signal capable of driving the IGBT system 115 (shown in FIG. 1). Those of skill in the art will appreciate that the Demand signal from the microprocessor 210 may be a relatively low level digital signal in an example embodiment and the IGBT system 115 may require a higher voltage signal to drive the firing cards of the IGBT system 115. Additionally, the frequency of the Demand signal in an example embodiment may be directly related to the frequency at which the IGBT system 115 may be switched. In an example embodiment, the firing circuit 240 may monitor the current flow in the IGBT system 115. The ability to monitor the IGBT system 115 with the firing circuit 240 may enable signals to be sent back to the microprocessor 210 to override the Demand signal in the event that an exceptional situation is present in the IGBT system 115, such as a circumstance that requires a more rapid response.

Figure 3:
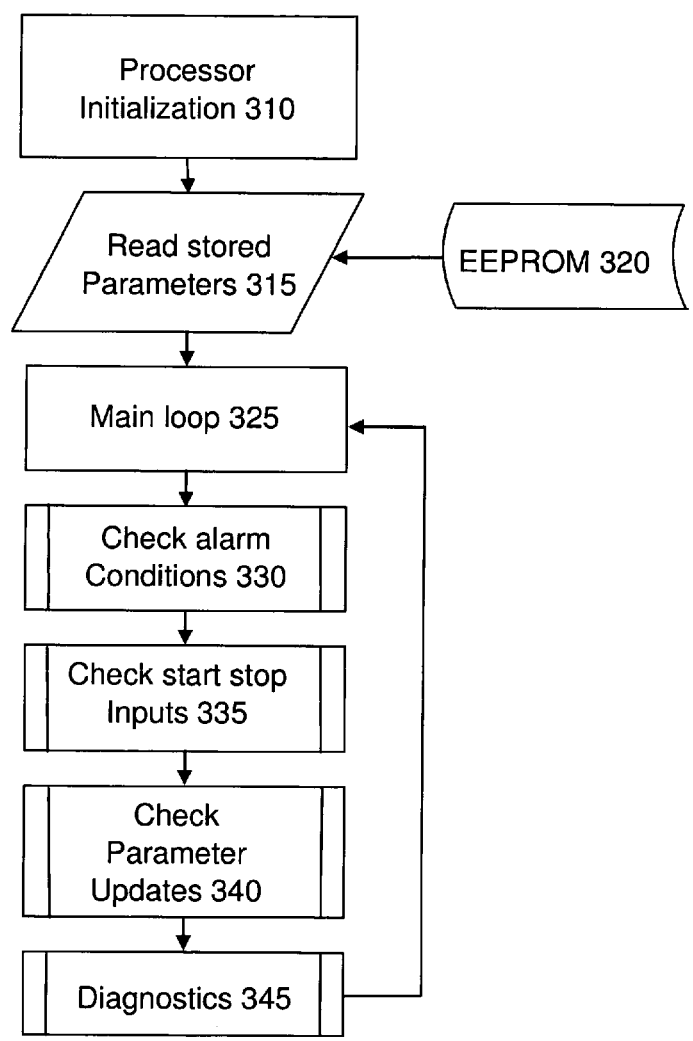
FIG. 3 is a flow chart for the main processing module 305 of the method for precipitator power frequency conversion 300 in accordance with an example embodiment of the disclosed technology.

FIG. 3 provides a flow chart for the main processing module 305 of the method for precipitator power frequency conversion 300 in accordance with an example embodiment of the disclosed technology. In an example embodiment, the converter control system 105 may be enabled to store and operate a software application that executes the method for precipitator power frequency conversion 300. The method for precipitator power frequency conversion 300, in an example embodiment, may be enabled for implementation in main processing module 305 as shown in FIG. 3, for example, for executing the main functions of the software application.

As shown in FIG. 3, and according to an example implementation, the first step 310 of an of the main processing module 305 may include a processor initialization sequence 310. In an example embodiment, the processor initialization sequence 310 may involve powering up and initializing the microprocessor 210 of the converter control system 105. Additionally, in an example embodiment, the processor initialization sequence 310 may involve initializing the microprocessor 210 inputs/outputs and the embedded smart peripherals of the converter control system 105. In an example embodiment, the peripherals of the converter control system 105 may include timers, a pulse width modulation controller, an input capture unit, and/or a communications controller. Those of skill in the art will appreciate that a variety of the different peripherals may be included in the converter control system 105, depending upon the requirements of a given implementation.

According to example implementations of the disclosed technology, once the first step of processor initialization 310 is complete, the second step 315 of reading stored parameters may be executed. For example, in the read stored parameters step 315 of an example embodiment of the method for precipitator power frequency conversion 300, the microprocessor 210 may read stored initialization and other parameter values from a non-volatile memory source, such as Electrically Erasable Programmable Read Only Memory (EEPROM) 320 shown in FIG. 3. Those of skill in the art will appreciate that the parameters stored in the EEPROM 320 may include a variety of different predetermined and user-configurable settings for the precipitator power frequency converter system 100. In an example embodiment of the converter control system 105, the parameters from the non-volatile EEPROM 320 may be read into a volatile memory provided in communication with the microprocessor 210 for access and execution by the various processes of the method for precipitator power frequency conversion 300.

According to an example implementation of the disclosed technology, after the read stored parameters step 315 is executed by the microprocessor 210, the main loop 325 may be initiated. In the main loop 325, the method for precipitator power frequency conversion 300 may be configured to iteratively perform the functions of the converter control system 105. The first step 330 of the main loop 325 of an example embodiment of the method for precipitator power frequency conversion 300 may involve checking alarm conditions 330. Those of skill in the art may appreciate that the alarm conditions evaluated in step 330 may vary upon implementation. In one embodiment, the method for precipitator power frequency conversion 300 may involve checking the alarm conditions of the phase fail detector 205 of the converter control system 105 to determine whether a failure exists in the three phases of supplied power. In an example implementation, the method for precipitator power frequency conversion 300 may involve checking the alarm conditions of the spark detection device 235 to determine whether a sparking or arcing condition is present in the precipitator. In addition to checking external input signals, the microprocessor 210 may execute the check alarm conditions step 330 to evaluate the internal operating conditions for various alarm conditions.

Ian example embodiment, the main loop 325 may include the step 335 of checking start/stop inputs. This step 335, for example, may include monitoring input signals after power to the electrostatic precipitator is stopped to determine if permission has been given to begin firing the IGBT system 115. As shown in FIG. 3, the main loop 325 may include the step 340 of checking for parameter updates. In an example embodiment, the step 340 may enable the user of the converter control system 105 to change the operating parameters of the system 105. For instance, the user may change the safe level at which power is stopped upon detection by the phase fail detector 205. In an example embodiment, the method for precipitator power frequency conversion 300 may continually execute the step 340 of checking for parameter updates and may modify the settings of the system 105 as soon as the changes are input by the user or system 100. In an example implementation, the method for precipitator power frequency conversion 300 may also include a diagnostics step 345 to perform internal checks for communication, internal operations, and evaluate the microprocessor 210 signal output pins for troubleshooting.

Figure 4:
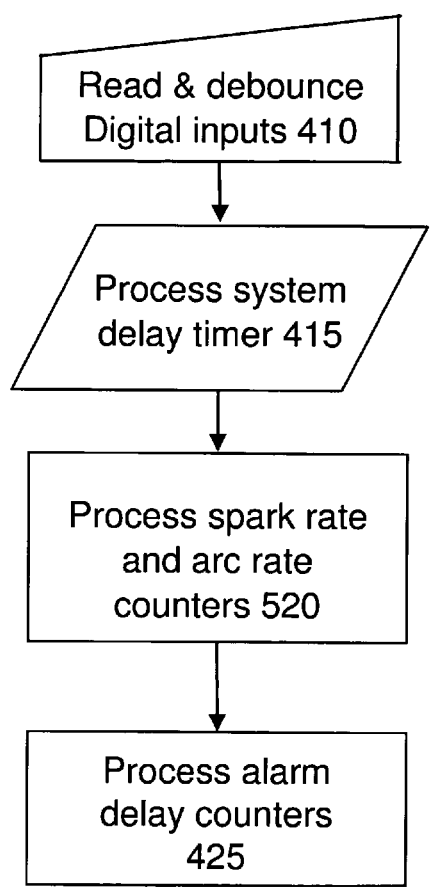
FIG. 4 is a flow chart for the system timer processing module 405 of the method for precipitator power frequency conversion 300 in accordance with an example embodiment of the disclosed technology.

FIG. 4 provides a flow chart for the system timer processing module 405 of the method for precipitator power frequency conversion 300, in accordance with an example embodiment of the disclosed technology. In the example embodiment shown in FIG. 4, the first step 410 of the system timer processing module 405 may involve reading and de-bouncing the digital inputs of the converter control system 105. For example, the input signals evaluated in check alarm conditions step 330 and the check start/stop inputs step 335 of the main processing module 305 may be checked on a time interval in step 410 to eliminate transient signals to ensure a stable input signal is analyzed by the microprocessor 210. Those of skill in the art will appreciate that the reading and de-bouncing step 410 may be executed in a variety of manners to ensure to the stability of the operations performed by the main processing module 305 of an example embodiment of the method for precipitator power frequency conversion 300.

As shown in FIG. 4, the system timer processing module 405 may also include the step 415 of processing the system delay timer. In an example embodiment, the processing the system delay timer step 415 may involve determining the appropriate delay before sending a firing instruction to the IGBT system 115. Furthermore, the system timer processing module 405 may include the step 420 of processing the spark rate and arc counters. In an example embodiment of the converter control system 105, the microprocessor 210 may be configured to execute step 420 by keeping a count of the number of sparks and arcs that the electrostatic precipitator powered by the precipitator power frequency converter system 100 has experienced in the past predetermined time period. For example the predetermined time period may be one minute. In another example implementation, the predetermined time period may be 30 seconds. According to an example implementation of the disclosed technology, the predetermined time period may range from and be set from approximately 5 seconds to approximately 10 minutes. By keeping an accurate count of the number and extents of sparks, the converter control system 105 may be configured to more efficiently deliver power. As shown in FIG. 4, the system timer processing module 405 of an example embodiment of the method for precipitator power frequency conversion 300 may also include the step 425 of processing the alarm delay counters. The processing alarm delay counters step 425 may include determining the time period for which a particular default, such as a single phase loss in power, has occurred. In an example embodiment, the method for precipitator power frequency conversion 300 may rely upon certain predetermined alarm duration values, and when the processing alarm delay counters step 425 determines a predetermined alarm duration value has been exceeded, then the converter control system 105 may activate a particular alarm or shut down a portion of the precipitator power frequency converter system 100.

Figure 5:
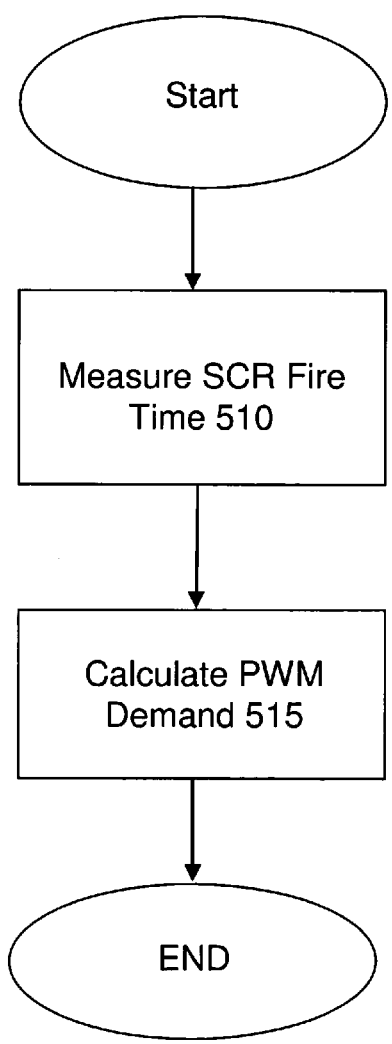
FIG. 5 is a flow chart for the silicon controlled rectifier (SCR) fire management module 505 of the method for precipitator power frequency conversion 300 in accordance with an example embodiment of the disclosed technology.

FIG. 5 is a flow chart for the SCR fire management module 505 method for precipitator power frequency conversion 300 in accordance with an example embodiment of the disclosed technology. In the example embodiment shown in FIG. 5, the first step 510 of the SCR fire management module 505 may involve analyzing the SCR inputs 125 130 from the conventional TR controller 110 and the zero cross event. In an example embodiment of the method for precipitator power frequency conversion 300, the step 510 of measuring SCR fire time enables the microprocessor 210 to measure the demand signal. In one embodiment, the measuring SCR fire time step 510 may involve reading the SCR outputs 125 130 and may also involve analyzing the input power, such as the line voltage, to determine when it passes through the zero level. Specifically, in an example embodiment, the measuring SCR fire time step 510 may involve determining the demand of the Conventional TR Controller 110. Next, and according to example implementations of the disclosed technology, step 515 of the SCR fire management module 505 may involve calculating a Pulse Width Modulation (PWM) Demand, and/or, may involve analyzing the measured demand signal to calculate an internal PWM Demand used to increase or decrease the PWM pulse width of an example embodiment of the precipitator power frequency converter system 100. In an example embodiment, this PWM Demand may be manipulated for the change in frequencies and may be used as a Demand to control the conduction angle communicated to the IGBT system 115.

Figure 6:
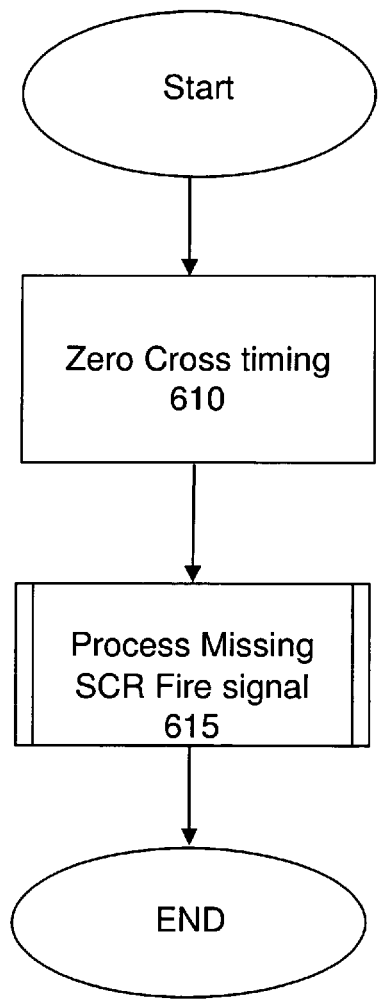
FIG. 6 is a flow chart for the zero cross time processing module 605 of the method for precipitator power frequency conversion 300 in accordance with an example embodiment of the disclosed technology.

FIG. 6 is a flow diagram for the zero cross time processing module 605 of the method for precipitator power frequency conversion 300, in accordance with an example embodiment of the disclosed technology. In the example embodiment shown in FIG. 6, the zero cross time processing module 605 may require the execution of the zero cross timing step 610 to capture the zero cross as a time event that may be used in an example embodiment to measure SCR fire time. Additionally, the zero cross time processing module 605 may require the execution of step 615 involving processing the missing SCR fire signal. Processing the missing SCR firing signal step 615 may involve checking for whether an SCR fire input has been received since the previously detected zero cross input.

Figure 7:
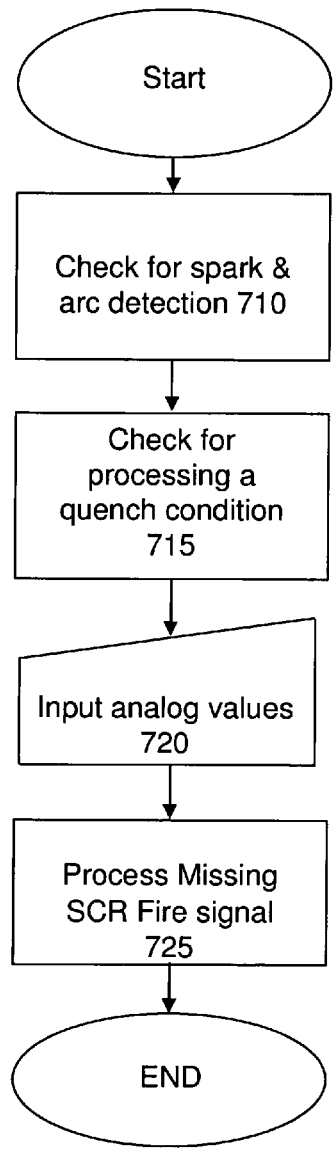
FIG. 7 is a flow chart of the pulse width modulation (PWM) control processing module 705 of the method for precipitator power frequency conversion 300 in accordance with an example embodiment of the disclosed technology.

FIG. 7 is a flow diagram for the PWM control processing module 705 of the method for precipitator power frequency conversion 300 in accordance with an example embodiment of the disclosed technology. In the example embodiment shown in FIG. 7, the first step 710 of the PWM control processing module 505 may involve checking for spark and arc detection. For example, the microprocessor 210 may evaluate the signal from the spark detection device 235 to determine whether a spark has been detected since the last evaluation of the signal by the microprocessor 210. In an example embodiment, if a spark has been detected by the spark detection device 235, the method for precipitator power frequency conversion 300 may require an adjustment to the PWM pulse width of the precipitator power frequency converter system 100. Additionally, the step 710 of checking for sparks and arcs may involve checking the secondary voltage reading history to determine the occurrence of a spark based on analog readings.

The PWM control processing module 705, according to an example embodiment of the method for precipitator power frequency conversion 300, may also include the step 715 for checking for a quench condition. In the event that quench condition has been instructed by the converter control system 105, then the step 715 of checking for a quench condition may result in a determination by the PWM control processing module 705 of how long the PWM by the precipitator power frequency converter system 100 must be powered off.

In an example implementation, the PWM processing control module 705 may also include the step 720 of evaluating input analog values, such as the primary, secondary, and manual control analog values for averaging and spark detection. Furthermore, the PWM processing control module 705 may include the step 725 of calculating the new PWM demand. In an example embodiment of the method for precipitator power frequency conversion 300, the step 725 may involve determining a new optimum PWM demand based on a previous PWM demand criteria and input signals. For example, the PWM demand criteria may be configured based on certain user configurable parameters. Therefore, in an example embodiment, the user may establish various desired responses by the converter control system 105 to a variety of input and alarm situations for the precipitator power frequency converter system 100.

Figure 8:
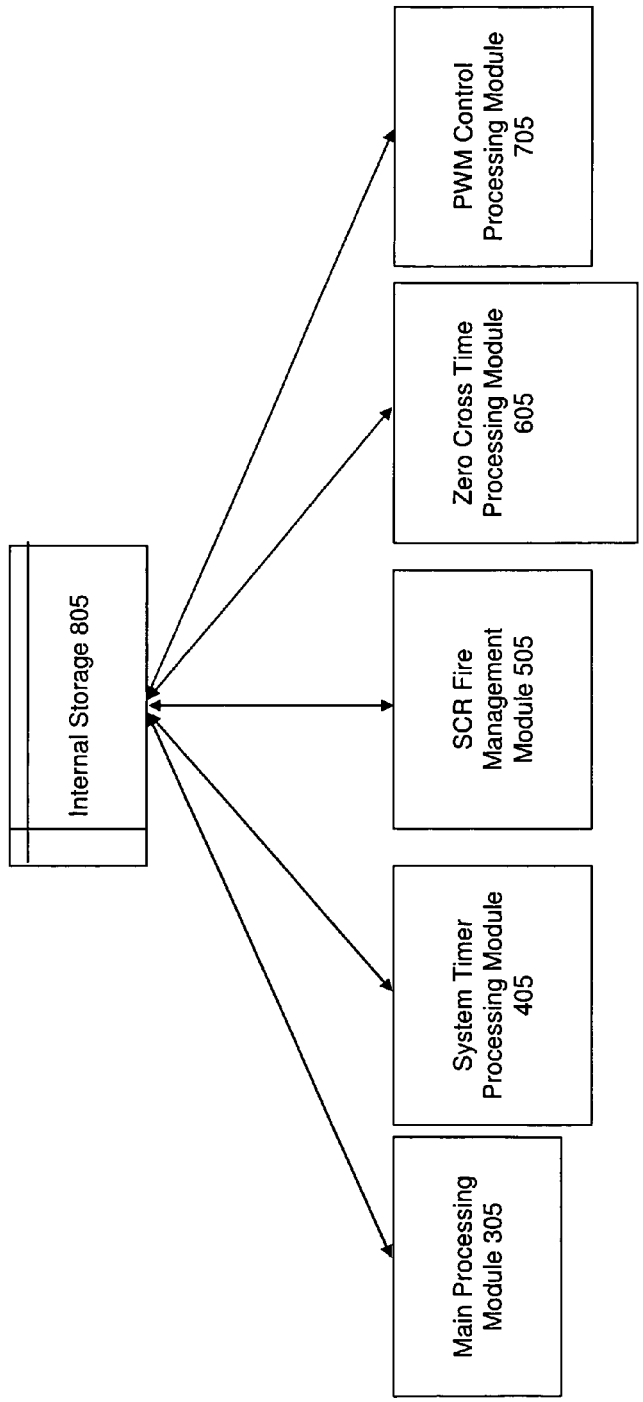
FIG. 8 is a block diagram of internal storage 805 for the various modules of the method for precipitator power frequency conversion 300 in accordance with an example embodiment of the disclosed technology.

FIG. 8 provides a block diagram of internal storage 805 for the various modules of the method for precipitator power frequency conversion 300 in accordance with an example embodiment of the disclosed technology. As shown in the example embodiment in FIG. 8, each of the modules 305 405 505 605 705 of the method for precipitator power frequency conversion 300 may be configured with direct access to the internal storage device 805 of the converter control system 105. Therefore, the method for precipitator power frequency conversion 300 may enable each module to independently access and store the data relevant to the operation of that particular module.

Figure 9A:
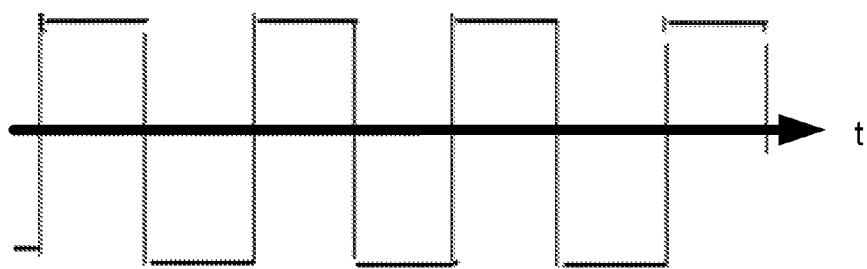
FIG. 9A depicts a 100% duty cycle pulse width modulation method for controlling the primary power delivered to the TR primary in accordance with an example embodiment of the disclosed technology.
Figure 9B:
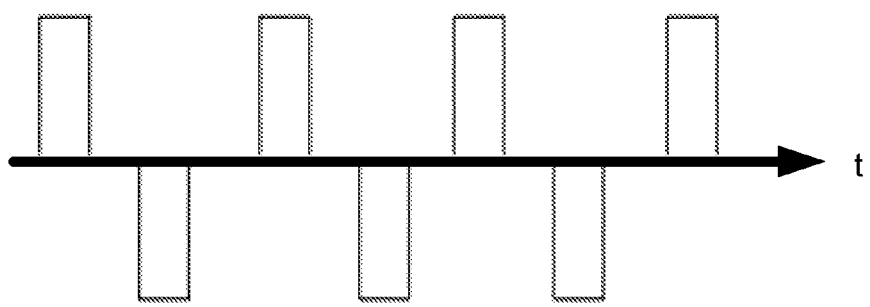
FIG. 9B depicts an example of a reduced pulse width modulation method for controlling the primary power delivered to the TR primary in accordance with an example embodiment of the disclosed technology.
Figure 10:
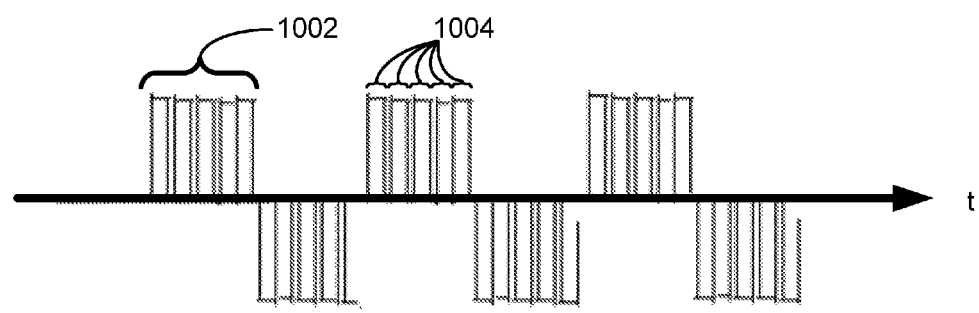
FIG. 10 depicts a PWM method that provides effective amplitude modulation for controlling primary power delivered to the TR primary in accordance with an example embodiment of the disclosed technology.

FIG. 9A and FIG. 9B depict a first technique for providing controlled power to the TR utilizing pulse width modulation (PWM). FIG. 9A depicts a PWM signal having a 100% duty cycle (i.e., on-time vs. off-time) for switching the IGBTs. FIG. 9B depicts a PWM signal having a reduced duty cycle of approximately 40% to 50%. Note that the duty cycle percentage may be calculated as a percentage of the "on" time, which may include both positive and negative signal with respect to a reference. In one example embodiment, the PWM may utilize a fixed base frequency and the duty cycle may be adjusted to control the amount of power delivered to the TR. In another example implementation, the base frequency and/or the duty cycle may be varied for optimum excitation of the TR. According to example implementations of the disclosed technology, and according to the first technique for providing controlled power to the TR, the base frequency may be set within the range of approximately 400 Hz to 1000 Hz, and the duty cycle may vary from 0% to approximately 100%. In an example implementation, when operating at the preset frequency of 400 Hz and above, the system may employ a simple PWM of the power pulses delivered to the TR primary. For example, the PWM pulses may occur at a fixed rate with the width of the pulses (positive and negative) varied to affect the level of power to be delivered to the TR FIG. 10 depicts a second technique, according to example implementations of the disclosed technology, that may be utilized for providing controlled power to the TR. This second technique may enable the precipitator power frequency conversion system to accommodate a wide frequency range, for example, from as low as 100 Hz to as high as 1000 Hz. According to example embodiments employing this second technique, "quasi-amplitude modulation" of the power pulses may be provided by maintaining a fixed base pulse 1002 having a fixed duty cycle at the base frequency, with the "amplitude modulation" achieved by application of a variable PWM pulse train 1004 within the base pulses 1002. According to an example implementation, when the quasi-amplitude modulation technique is used, the on/off time of the base frequency (i.e., corresponding to the base pulses 1002) may be maintained at a 50% duty cycle while the effective amplitude may be achieved by modulating the base pulses 1002 with a PWM pulse train 1004 that is a higher multiple of the base frequency.

In certain example embodiments, the PWM frequency of the pulse train 1004 within the base pulses 1002 may be set from approximately 4 times, to approximately 16 times the base frequency. According to an example implementation of the disclosed technology, the variation of the pulse widths of the PWM pulse train 1004 within the base pulses 1002 may provide an effective amplitude modulation (or quasi-amplitude modulation) of the pulses that are delivered to the TR at the base frequency. The lower base frequency operation of the base pulses 1002 may provide enhanced power transfer for the precipitator system, particularly in systems having high inductance in the TR transformer and associated components.

Example embodiments of the disclosed technology may provide two distinctly different modes of operation. For example, a simple PWM technique (as depicted in FIG. 9A and FIG. 9B) may be utilize in one range of base frequencies, while the quasi-amplitude modulation technique (as depicted in FIG. 10) may be utilized for another range of base frequencies.

In an example implementation, the precipitator power frequency conversion system may allow operator intervention via the Front Panel control to set the base frequency and/or mode of operation. In another example implementation, the precipitator power frequency conversion system may automatically set the base frequency and/or the operation mode, for example, under control of the operating program. In an example implementation, the automatic frequency/mode control may be enabled or disabled by user setting. According to example implementations of the disclosed technology, when the automatic frequency/mode control is enabled, the operating program may check the operating output current as a function of excitation voltage of the TR primary circuit. This relationship may permit the calculation of the voltage drop across the effective inductance of the primary TR circuit. In one embodiment, if this voltage drop is determined to be a limiting factor of maximum power level that may be delivered to the ESP, then a lower base frequency may be utilized. In an example implementation, the lower base frequency may effectively decrease the voltage drop of the series inductance and permit higher operating levels. Conversely, if excessive sparking is detected at low conduction levels, then the system may increase the frequency to reduce ripple levels and permit higher voltage before sparking occurs.

An example method 1100 for providing power to a device will now be described with reference to the flowchart of FIG. 11. The method 1100 starts in block 1102, and according to an example implementation includes receiving a first silicon controlled rectifier (SCR) signal and a second SCR signal from a controller device. In block 1104, the method 1100 includes generating a demand signal by the controller device based on a comparison of the first and second SCR signals. In block 1106, the method 1100 includes transmitting the demand signal to a power converter device. In block 1108, the method 1100 includes converting a first power signal from a first base frequency to a second power signal at a second base frequency, wherein the first base frequency is in the range of approximately 50 Hz to approximately 60 Hz and wherein the second base frequency is controlled in the range of approximately 100 Hz to approximately 1000 Hz. In block 1110, the method 1100 includes switching the second power signal to the controller device.

According to an example implementation of the disclosed technology, the method may further include automatically controlling the second base frequency. In an example implementation, automatically controlling the second base frequency may be based at least in part on a voltage drop signal. In accordance with an example implementation of the disclosed technology, switching may include pulse width modulation (PWM) at the second base frequency. In one example implementation, switching may include quasi-amplitude modulation utilizing PWM within signals or pulses associated with the second base frequency, and wherein the PWM frequency is higher than the second base frequency. In a certain example implementation, the PWM frequency is in a range of 4 to 16 times the second base frequency.

In accordance with an example implementation of the disclosed technology, switching the second power signal to the controller device may include automatically selecting a switching mode, wherein a first switching mode includes pulse width modulation (PWM) at the second base frequency and a second switching mode includes quasi-amplitude modulation utilizing PWM within signals our pulses associated with the second base frequency, and wherein the PWM frequency is higher than the second base frequency. In certain example implementations, the switching mode is automatically selected based at least in part on a voltage drop signal. In another example implementation, the first switching mode may be automatically selected for second base frequencies greater than 400 Hz, and the second switching mode may be automatically selected for second base frequencies less than or equal to 400 Hz.

In a certain example implementation, the method may include enabling the demand signal to actuate an insulated-gate bipolar transistor ("IGBT") system. In one example implementation, enabling the demand signal to actuate the IGBT system includes converting the demand signal to a voltage level capable of driving the IGBT system. Certain example implementations may include monitoring a spark detection signal and ceasing to generate a demand signal when the spark detection signal is present. Another implementation may further include monitoring a phase fail detector signal and ceasing to generate a demand signal when the phase fail signal is present. Another implementation may further include generating an output from the IGBT system to a transformer rectifier set.

According to example implementations, certain technical effects can be provided, such as creating certain systems and methods that provide enhanced and efficient power transfer for use with electrostatic precipitators. Example implementations of the disclosed technology can provide the further technical effects of providing systems and methods that allow automatic control of switching operational modes and/or base frequencies in power signals for efficient power conversion.

In example implementations of the disclosed technology, systems associated with the precipitator power frequency conversion 300 may include any number of hardware and/or software applications that are executed to facilitate any of the operations. In example implementations, one or more I/O interfaces may facilitate communication between systems associated with the precipitator power frequency conversion 300 and one or more input/output devices. For example, a universal serial bus port, a serial port, a disk drive, a CD-ROM drive, and/or one or more user interface devices, such as a display, keyboard, keypad, mouse, control panel, touch screen display, microphone, etc., may facilitate user interaction with systems associated with the precipitator power frequency conversion 300. The one or more I/O interfaces may be utilized to receive or collect data and/or user instructions from a wide variety of input devices. Received data may be processed by one or more computer processors as desired in various implementations of the disclosed technology and/or stored in one or more memory devices.

One or more network interfaces may facilitate connection of the system inputs and outputs to one or more suitable networks and/or connections; for example, the connections that facilitate communication with any number of sensors associated with the system. The one or more network interfaces may further facilitate connection to one or more suitable networks; for example, a local area network, a wide area network, the Internet, a cellular network, a radio frequency network, a Bluetooth enabled network, a Wi-Fi enabled network, a satellite-based network any wired network, any wireless network, a proximity network, etc., for communication with external devices and/or systems.

Certain implementations of the disclosed technology are described above with reference to block and flow diagrams of systems and methods and/or computer program products according to example implementations of the disclosed technology. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some implementations of the disclosed technology.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, implementations of the disclosed technology may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special-purpose hardware and computer instructions.

While certain implementations of the disclosed technology have been described in connection with what is presently considered to be the most practical and various implementations, it is to be understood that the disclosed technology is not to be limited to the disclosed implementations, but on the contrary, is intended to cover various modifications and equivalent arrangements included within the scope of the appended claims. Although specific terms are employed herein, they are used in a generic and descriptive sense only and not for purposes of limitation.

This written description uses examples to disclose certain implementations of the disclosed technology, including the best mode, and also to enable any person skilled in the art to practice certain implementations of the disclosed technology, including making and using any devices or systems and performing any incorporated methods. The patentable scope of certain implementations of the disclosed technology is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

While the disclosed technology has been disclosed in its preferred forms, it will be apparent to those skilled in the art that many modifications, additions, and deletions may be made therein without departing from the spirit and scope of the disclosed technology and its equivalents as set forth in the following claims.

We claim:

1. A method of providing power to a device comprising:
   receiving a first silicon controlled rectifier (SCR) signal and a second SCR signal from a controller device;
   generating a demand signal by the controller device based on a comparison of the first and second SCR signals;
   transmitting the demand signal to a power converter device;
   converting a first power signal from a first base frequency to a second power signal at a second base frequency, wherein the first base frequency is in the range of approximately 50 Hz to approximately 60 Hz and wherein the second base frequency is controlled in the range of approximately 100 Hz to approximately 1000 Hz; and
   switching the second power signal to the controller device.

2. The method of claim 1, further comprising automatically controlling the second base frequency.

3. The method of claim 2, wherein automatically controlling the second base frequency is based at least in part on a voltage drop signal.

4. The method of claim 1, wherein switching comprises pulse width modulation (PWM) at the second base frequency.

5. The method of claim 1, wherein switching comprises quasi-amplitude modulation utilizing PWM within signals associated with the second base frequency, and wherein the PWM frequency is higher than the second base frequency.

6. The method of claim 5, wherein the PWM frequency is in a range of 4 to 16 times the second base frequency.

7. The method of claim 1, wherein switching the second power signal to the controller device comprises automatically selecting a switching mode, wherein a first switching mode comprises PWM at the second base frequency and a second switching mode comprises quasi-amplitude modulation utilizing PWM within signals associated with the second base frequency, and wherein the PWM frequency is higher than the second base frequency.

8. The method of claim 7, wherein the switching mode is automatically selected based at least in part on a voltage drop signal.

9. The method of claim 7, wherein the first switching mode is automatically selected for second base frequencies greater than 400 Hz, and the second switching mode is automatically selected for second base frequencies less than or equal to 400 Hz.

10. The method of claim 1 further comprising enabling the demand signal to actuate an insulated-gate bipolar transistor (IGBT) system.

11. The method of claim 10, wherein enabling the demand signal to actuate the IGBT system comprises converting the demand signal to a voltage level capable of driving the IGBT system.

12. The method of claim 1, further comprising monitoring a spark detection signal and ceasing to generate a demand signal when the spark detection signal is present.

13. The method of claim 1, further comprising monitoring a phase fail detector signal and ceasing to generate a demand signal when the phase fail signal is present.

14. The method of claim 1, further comprising generating an output from the IGBT system to a transformer rectifier set.

15. A system comprising:
   a precipitator power frequency converter system including:
      an insulated-gate bipolar transistor (IGBT) system;
      a converter control system comprising a microprocessor in communication with the IGBT system; and
      a rectifier set in communication with the IGBT system;
   wherein the microprocessor is configured to receive a first silicon controlled rectifier (SCR) signal and a second SCR signal from a transformer rectifier control device, and wherein the microprocessor is further configured for generating a switching signal to actuate the IGBT system based at least in part on a comparison of the first SCR signal and the second SCR signal; and
   wherein an input power is received by the precipitator power frequency converter system in a first base frequency range of approximately 50 Hz to 60 Hz and the precipitator power frequency converter system is enabled to selectively provide an output power in a second base frequency controlled in a range between 100 Hz and 1000 Hz.

16. The system of claim 15, wherein the second base frequency is automatically controlled based at least in part on a voltage drop signal; and wherein generating the switching signal to actuate the IGBT system comprises generating pulse width modulation (PWM) at the second base frequency.

17. The system of claim 15, wherein the second base frequency is automatically controlled based at least in part on a voltage drop signal; and wherein generating the switching signal to actuate the insulated-gate bipolar transistor IGBT system comprises generating quasi-amplitude modulation utilizing PWM within signals associated with the second base frequency, and wherein the PWM frequency is higher than the second base frequency.

18. The system of claim 15, wherein generating the switching signal to actuate the insulated-gate bipolar transistor IGBT system comprises automatically selecting a switching mode, wherein a first switching mode comprises PWM at the second base frequency and a second switching mode comprises quasi-amplitude modulation utilizing PWM within signals associated with the second base frequency, and wherein the PWM frequency is higher than the second base frequency.

19. The system of claim 18, wherein the first switching mode is automatically selected for second base frequencies greater than 400 Hz, and the second switching mode is automatically selected for second base frequencies less than or equal to 400 Hz.

20. The system of claim 15, wherein the microprocessor is further configured to:
   receive a phase fail detection signal indicating a deficiency in the power source;
   receive a spark detection signal indicating a spark in an electrostatic precipitator; and
   modify the switching signal to actuate IGBT system based at least in part on one or more of the phase fail detection signal and the spark detection signal.

* * * * *